United States Patent Office 3,211,515
Patented Oct. 12, 1965

3,211,515
PROCESS FOR THE TREATMENT OF ARTICLES CONSISTING OF SYNTHETIC POLYMERS AND PRODUCTS OBTAINED THEREBY
Lucien Bonnard, Villeurbanne, France, assignor to Societe Rhodiaceta, Paris, France, a French corporation
No Drawing. Filed Oct. 11, 1962, Ser. No. 229,977
Claims priority, application France, Oct. 19, 1961, 876,451
7 Claims. (Cl. 8—115.5)

The invention relates to the treatment of synthetic polymer articles to improve their affinity for dyes.

Various processes have already been proposed for improving the dyeing affinity of the synthetic polymers used for the manufacture of yarns, fibers, films, etc.

It is for example possible to create in the macromolecular chain reactive sites which are capable of fixing acid or basic dyes. This can be achieved either by grafting certain monomers on the already formed macromolecule, or by introducing, during the polycondensation or other polymerisation reaction, compounds which can enter the chain and which carry reactive groups.

It has also been proposed to modify the crystalline structure of the polymers by physical treatments so as to permit a more complete penetration of the dyes. It is also possible to lower the cohesion of the chains and thus to promote the setting of the dyes on the yarns, or other articles by the use of carriers in the dyeing bath.

The present invention relates patricularly to the treatment of shaped articles such as yarns, fibers, films, etc., made from synthetic linear polyesters.

The process of the invention comprises subjecting an article of a high linear polyester to the action of at least one complex obtained from boron trifluoride and an organic compound having a doublet of free electrons (lone pair) readily accessible to the boron trifluoride.

The invention also comprises articles having an improved receptivity with respect to dyes and obtained by the above process, and products made from them, and also the dyed articles and products.

The polymers used for the preparation of yarns, fibers, films, etc., to which the process is applicable are the synthetic linear homopolyesters and copolyesters mainly obtained from aromatic diacids such as terephthalic acid, isophthalic acid, dicarboxy-3,5-phenol and dicarboxy-4-4'-diphenylsulphone, and diols such as ethylene glycol, di-(hydroxymethyl)-1,4-cyclohexane, etc.

Among the organic compounds having an electronic doublet which is readily accessible to the boron trifluoride used for the preparation of complexes, the following may be mentioned: alcohols especially the lower alkanols such as methanol and the lower alkylene glycols such as ethylene glycol; ethers, especially di-lower alkyl ethers such as diethyl ether; esters, especially lower alkyl esters of lower alkanoic acids, such as ethyl formate and ethyl acetate; and heterocyclic compounds, especially cyclic polymethylene mono and di-ethers, such as tetrahydrofuran and dioxan. (The term "lower" is employed to signify that this molecule or group concerned contains up to 4 carbon atoms.)

The complexes of these compounds with boron trifluoride are generally stable at temperatures above normal temperature and have boiling points higher than that of the organic constituent. They have little toxic activity in practice, and their handling on an industrial scale does not present any particular problems from the point of view of corrosion or inflammability, even though the individual constituents may be corrosive (as in boron trifluoride) or inflammable (as is diethyl ether).

The complex is preferably used in the pure state, but it is also possible to use a solution of the complex in the organic constituent or in any other suitable solvent.

The treatment can be carried out at normal temperature but it is preferred to use higher temperatures, in particular temperatures between 25° and 100° C.

The duration of the treatment is a function of the temperature and the complex being used: it can vary from a few seconds up to 2 hours for temperatures between 100° and 25° C.

The treatment can be carried out in various ways. For example the article may be immersed in a bath formed by the pure complex or a solution thereof kept at a temperature between 25° and the boiling point.

In another method the article is first impregnated with the complex at ambient temperature, e.g. by atomisation, padding or immersion, and then heated, for example by passing it through an oven. In this method it is preferable to work continuously.

After the articles have been treated, they are preferably washed in order to remove the excess of complex. The washing operations can be carried out by means of the organic complexing constituent or water, to which if desired an alkali such as sodium bicarbonate, or a surface-active agent or other washing aid is added. When washing with water, the solution recovered by centrifuging must have a pH of at least 6.

It is found that articles so treated have a very markedly increased dyeing affinity, particularly with respect to basic and dispersed dyes.

The process of the invention can also be used to obtain differential dyeing effect, e.g. prints, as by resist or overtone printing, on films, fabrics and the like. It is sufficient for this purpose to protect certain parts of the film or fabric against the action of the active complex; these parts will absorb little or none of the dye during the dyeing operation and will stand out in white or a lighter shade.

It is also noted that the fabrics obtained according to the invention have a less pronounced tendency to filling than the untreated fabrics.

The following examples illustrate the invention without limiting it in any way.

*Example 1*

A batch of 2.838 g. of de-oiled polyester yarn (ethylene polyterephthalate) is treated for 2 hours at 25° C. with the complex of ethyl acetate and boron trifluoride. The yarn, after washing with water to pH 6, is dried at 50° C.

The weight of the batch after treatment is 2.827 g. The appearance of the yarn is unchanged, and the tenacity and elongation are very little affected. A deep blue colouring is obtained by dyeing at 100° C. with the basic dye marketed under the name "Bleu Astrazon 3 RL."

An untreated control sample is practically undyeable.

*Example 2*

A sample of de-oiled ethylene polyterephthalate yarn is treated for 2 hours at 25° C. with the complex of ethylene glycol and boron trifluoride, washed with an aqueous solution of monoethylamine and then with water, and dried at 50° C.

The appearance and the characteristics of the yarn are practically unchanged.

The yarn is effectively dyed at 130° C. with "Bleu Astrazon 3 RL," while the untreated yarn cannot be dyed.

*Example 3*

A sample of polyethylene terephthalate film is treated for 4 hours at 50° C. with the complex of diethyl ether and boron trifluoride.

After washing with water and drying, the sample is satisfactorily dyed red with the plastosoluble dye sold under the name "Ecarlate Esteroquinone JR" (Colour Index 11,150) at 100° C. and without a carrier, whereas an untreated control sample is only dyed a very pale pink.

*Example 4*

2.859 g. of a polyethylene terephthalate yarn 65 den./34 filaments is treated with the complex of ethyl acetate and boron trifluoride for 1 minute at 100° C. It is washed first with a solution of sodium bicarbonate and then with water, and then dried at 50° C., after treatment, it weighs 2.863 g.

The yarn is dyed satisfactorily at 100° C. with the basic dye "Bleu Astrazon 3 RL."

*Example 5*

A yarn identical to that of Example 4 is treated for 2 hours at 80° C. with a solution comprising 75 parts by volume of the complex of ethyl phthalate and boron trifluoride and 25 parts by volume of ethyl phthalate.

After washing and drying, the yarn is dyed satisfactorily at 100° C. with the dye "Bleu Basacryl GL," a control yarn cannot be dyed under these conditions.

*Example 6*

A polyethylene terephthalate roving is caused to pass continuously through a bath formed by the complex of diethyl ether and boron trifluoride, between drying rollers and is then led continuously through an oven kept at 100° C. (residence time a few minutes), into a washing bath containing water, and finally into a drying oven at 50° C.

The roving is easily dyed at 100° C. with the dye "Bleu Astazon 3 RL."

*Example 7*

A yarn of an interpolyester obtained from dimethyl terephthalate, dicarbomethoxy-3,5-phenol and ethylene glycol is treated for 1 hour at 50° C. with the complex of diethyl ether and boron trifluoride.

After washing, this yarn was coloured deep blue by dyeing at 100° C. with the dye "Bleu Astrazon 3 RL," whereas an untreated control sample is not dyed under these conditions.

*Example 8*

A sample of polyethylene terephthalate woven fabric, certain portions of which have been coated with Vaseline, is treated for 2 hours at 50° C. with the complex of tetrahydrofuran and boron trifluoride, and then washed with tetrahydrofuran, which removes the Vaseline.

After dyeing with the dye "Bleu Astrazon 3 RL," the fabric has a blue colouring, which is deeper on the parts which have not been protected by the Vaseline.

I claim:

1. Process for the treatment of shaped articles of high linear polyesters to increase their affinity for dyes, which comprises subjecting the article to the action of a complex of boron trifluoride with an organic compound selected from the group which consists of lower alkanols, lower alkylene glycols, di-lower alkyl ethers, polymethylene mono- and di-ethers, and lower alkyl esters of lower alkanoic acids.

2. Process according to claim 1, wherein the said article is selected from the group which consists of films, and textile articles.

3. Process according to claim 1, wherein the treatment is effected at a temperature of 25°–100° C.

4. Process according to claim 3, wherein the article is treated in a bath comprising the said complex.

5. Process according to claim 3, wherein the article is treated in a bath consisting essentially of a solution of the said complex in a further quantity of the organic constituent thereof.

6. Process according to claim 3, wherein the article is impregnated with the said complex at ambient temperature and is then heated.

7. Process according to claim 3, wherein the article is impregnated with a solution of the said complex in a further quantity of the organic constitutent thereof at ambient temperature and is then heated.

References Cited by the Examiner

UNITED STATES PATENTS 2,926,987 3/60 Freyermuth et al.
2,989,363 6/61 Hartmann et al.
3,098,691 7/63 Pascal.

OTHER REFERENCES

C.A., vol. 45, p. 9300(g), October–November 1951, ref. U.S. Pat. 2,559,062, July 3, 1951.

C.A., vol. 58, May 1963, p. 10344, ref. French Patent No. 1,310,679, 7 pp. spec., Nov. 30, 1962.

Moncrieff: Mothproofing, 1950, p. 138, Leonard Hill Ltd., London.

NORMAN G. TORCHIN, *Primary Examiner.*